US012596976B2

(12) United States Patent
Nakano et al.

(10) Patent No.: US 12,596,976 B2
(45) Date of Patent: Apr. 7, 2026

(54) OPERATIONS MANAGEMENT SYSTEM AND OPERATIONS MANAGEMENT METHOD

(71) Applicant: Panasonic Intellectual Property Management Co., Ltd., Osaka (JP)

(72) Inventors: Tomofumi Nakano, Osaka (JP);
Kazuma Tsujita, Hyogo (JP);
Hirotsugu Fusayasu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 18/219,350

(22) Filed: Jul. 7, 2023

(65) Prior Publication Data

US 2024/0202630 A1      Jun. 20, 2024

(30) Foreign Application Priority Data

Jul. 11, 2022    (JP) ................................. 2022-111313

(51) Int. Cl.
G06Q 10/0633        (2023.01)

(52) U.S. Cl.
CPC ................................ G06Q 10/0633 (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 11,170,244 B2 * | 11/2021 | Ozawa | ................... | G06V 20/40 |
| 2006/0269144 A1 * | 11/2006 | Kubota | ................. | G06F 18/232 |
| | | | | 382/225 |
| 2011/0295655 A1 * | 12/2011 | Tsuji | ..................... | G06Q 10/10 |
| | | | | 709/224 |

(Continued)

FOREIGN PATENT DOCUMENTS

| | | |
|---|---|---|
| JP | 2008-77424 | 4/2008 |
| JP | 2009-15529 | 1/2009 |

(Continued)

OTHER PUBLICATIONS

Office Action issued Feb. 24, 2026 in Japanese Patent Application No. 2022-111313, with English-language Translation.

*Primary Examiner* — Alan S Miller
(74) *Attorney, Agent, or Firm* — Wenderoth, Lind & Ponack L.L.P.

(57)        ABSTRACT

A storage device stores operation data sets as information representing, on a repeat unit basis, a time series variation of the location of at least one point on a body of a person. A first divider divides each of the operation data sets into a predetermined number of partial data. First and second operation data sets are divided into a plurality of first partial data and a plurality of second partial data, respectively. A degree of similarity calculator calculates a degree of similarity between each of the first partial data and a corresponding one of the second partial data, and also calculates a degree of first operation data set similarity by adding together the respective degrees of similarity of all of the first partial data. The estimator estimates a division point where the first operation data set is divided to maximize the degree of first operation data set similarity.

11 Claims, 9 Drawing Sheets

(56)           References Cited

U.S. PATENT DOCUMENTS

| | | | | |
|---|---|---|---|---|
| 2015/0187088 | A1* | 7/2015 | Iwai | G06T 11/206 |
| | | | | 345/634 |
| 2015/0365173 | A1* | 12/2015 | Yamasaki | G06K 19/06009 |
| | | | | 398/202 |
| 2017/0262727 | A1* | 9/2017 | Kozuka | G06F 18/2155 |
| 2018/0189700 | A1* | 7/2018 | Fuke | G06N 20/00 |
| 2020/0265256 | A1* | 8/2020 | Ozawa | G06V 20/40 |
| 2021/0223764 | A1* | 7/2021 | Nasu | G05B 23/0221 |
| 2023/0044842 | A1* | 2/2023 | Sato | G06Q 50/04 |
| 2024/0202630 | A1* | 6/2024 | Nakano | G06Q 10/0633 |

FOREIGN PATENT DOCUMENTS

| | | |
|---|---|---|
| JP | 2017-220018 | 12/2017 |
| JP | 2019-101919 | 6/2019 |
| JP | 2022-003491 | 1/2022 |

* cited by examiner

*FIG. 2* n=N n=N+1 n=N+2 n=N+M n=N+M+1

OPERATIONS MANAGEMENT SYSTEM AND OPERATIONS MANAGEMENT METHOD

CROSS-REFERENCE TO RELATED APPLICATIONS

The present application is based upon, and claims the benefit of priority to, Japanese Patent Application No. 2022-111313, filed on Jul. 11, 2022, the entire contents of which are hereby incorporated by reference.

TECHNICAL FIELD

The present disclosure generally relates to an operations management system and an operations management method. More particularly, the present disclosure relates to an operations management system and operations management method for managing operations to be performed repeatedly.

BACKGROUND ART

JP 2008-77424 A discloses an operations analysis system for making an analysis of operations being performed by a worker on a production line at a factory. The operations analysis system of JP 2008-77424 A captures video data representing how a worker, who is wearing markers at multiple points, is performing the operations. Based on this video data, the operations analysis system extracts locus data of the markers. Then, the operations analysis system of JP 2008-77424 A allows the user to specify a reference cycle, defining an interval for one cycle, based on the locus data of the markers. In this manner, the operations analysis system of JP 2008-77424 A detects a similarity interval in which the locus of the markers is similar to a reference cycle pattern representing the locus data of the reference cycle and a dissimilarity interval in which the locus of the marker is dissimilar to the reference cycle pattern.

According to the technique disclosed in JP 2008-77424 A, however, the user needs to specify an interval for one cycle.

SUMMARY

The present disclosure provides an operations management system and operations management method for managing operations to be performed repeatedly while allowing multiple tasks included in one cycle of the operations to be analyzed even without being specified by the user.

An operations management system according to an aspect of the present disclosure includes a storage device, a first divider, a degree of similarity calculator, and an estimator. The storage device stores multiple operation data sets. The multiple operation data sets are information representing, with respect to operations to be repeated a number of times, respectively, a time series variation in location of at least one point set on a body of a person who is performing the operations on a repeat unit basis. The first divider divides each of the multiple operation data sets into a predetermined number of partial data. The multiple operation data sets include a first operation data set and a second operation data set. The first operation data set is divided into a plurality of first partial data, each of which is the partial data. The second operation data set is divided into a plurality of second partial data, each of which is the partial data. The degree of similarity calculator calculates a degree of similarity between each of the plurality of first partial data and second partial data corresponding to the first partial data and belonging to the plurality of second partial data. The degree of similarity calculator also calculates a degree of first operation data set similarity by adding together the respective degrees of similarity that have been calculated with respect to all of the plurality of first partial data. The estimator estimates one or more division points where the first operation data set is divided to maximize the degree of first operation data set similarity.

An operations management method according to another aspect of the present disclosure includes a storing step, a dividing step, a degree of similarity calculating step, and an estimating step. The storing step includes storing multiple operation data sets. The multiple operation data sets are information representing, with respect to operations to be repeated a number of times, respectively, a time series variation in location of at least one point set on a body of a person who is performing the operations on a repeat unit basis. The dividing step includes dividing each of the multiple operation data sets into a predetermined number of partial data. The multiple operation data sets include a first operation data set and a second operation data set. The first operation data set is divided, by performing the dividing step, into a plurality of first partial data. The second operation data set is divided, by performing the dividing step, into a plurality of second partial data. The degree of similarity calculating step includes calculating a degree of similarity between each of the plurality of first partial data and second partial data corresponding to the first partial data and belonging to the plurality of second partial data. The degree of similarity calculating step further includes calculating a degree of first operation data set similarity by adding together the respective degrees of similarity that have been calculated with respect to all of the plurality of first partial data. The estimating step includes estimating one or more division points where the first operation data set is divided to maximize the degree of first operation data set similarity.

BRIEF DESCRIPTION OF DRAWINGS

The figures depict one or more implementations in accordance with the present teaching, by way of example only, not by way of limitations. In the figures, like reference numerals refer to the same or similar elements.

FIG. 2 is a schematic representation showing how the operations management system performs the operation of detecting respective locations of multiple points set on the body of a worker;

DETAILED DESCRIPTION

First Embodiment

An operations management system 1 according to the present disclosure will be described with reference to the accompanying drawings.

1. Work Management System

Figure 1:
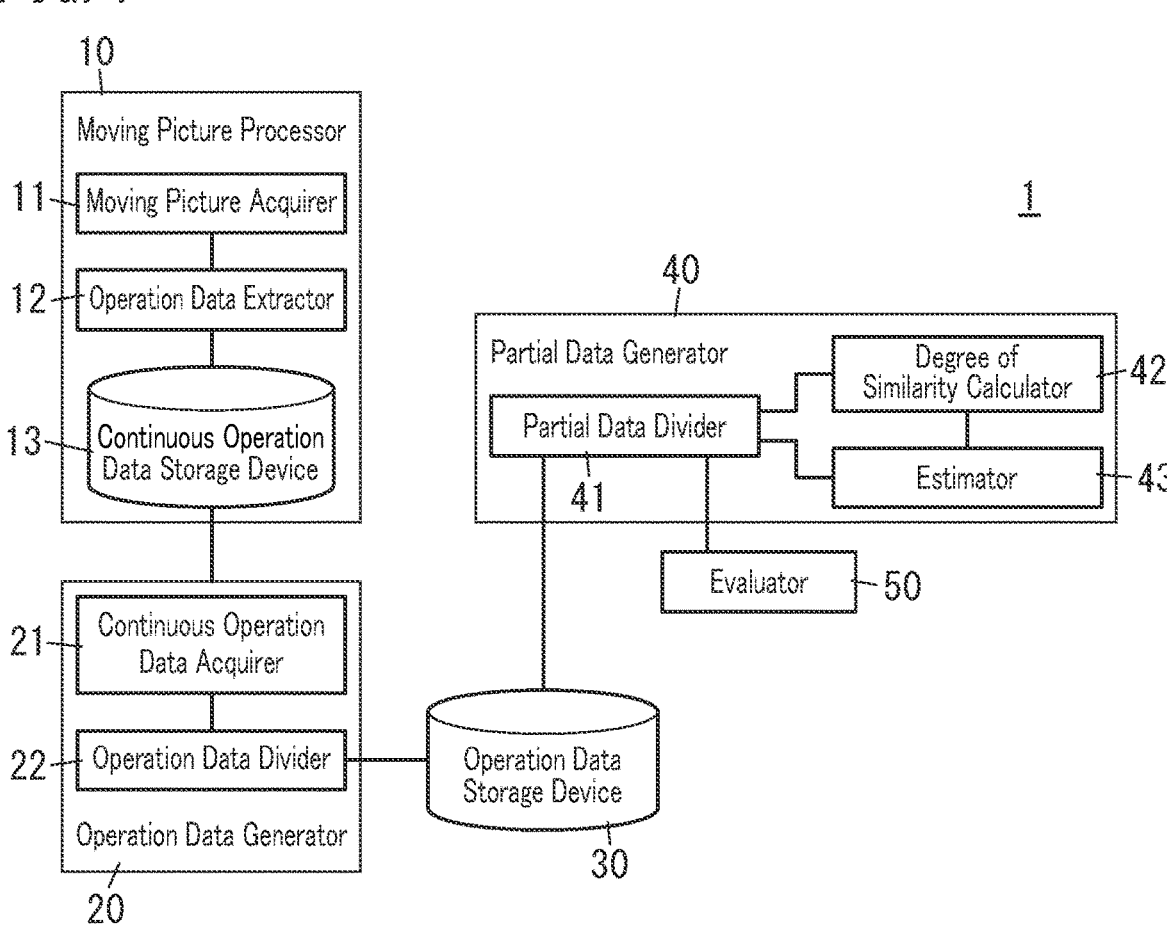
FIG. 1 is a functional block diagram of an operations management system according to a first embodiment.

FIG. 1 is a block diagram showing a logical configuration for an operations management system 1 according to a first embodiment. The operations management system 1 includes a moving picture processor 10, an operation data generator 20, an operation data storage device 30, a partial data generator 40, and an evaluator 50.

The operations management system 1 includes a computer system. The computer system may include a processor and a memory as principal hardware components. The functions of the operations management system 1 according to the present disclosure may be performed by making the processor execute a program stored in the memory of the computer system. Specifically, the processor that executes the program has the respective functions of the moving picture processor 10, the operation data generator 20, the partial data generator 40, and the evaluator 50. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, the plurality of functions of the operations management system 1 is aggregated together in a single housing. However, this is not an essential configuration for the operations management system 1. Alternatively, those constituent elements of the operations management system 1 may be distributed in multiple different housings. Still alternatively, at least some functions of the operations management system 1 (e.g., some functions of the moving picture processor 10) may be implemented as a cloud computing system as well.

Conversely, at least some functions of the operations management system 1 distributed in multiple functional units in the first embodiment may be aggregated together in a single housing. For example, some functions of the operations management system 1, which are distributed in the moving picture processor 10 and the operation data generator 20, may be aggregated together in a single housing.

2. Respective Constituent Elements of Operations Management System

Next, respective constituent elements of the operations management system 1 according to the first embodiment will be described.

(1) Moving Picture Processor

The moving picture processor 10 acquires a moving picture by repeatedly shooting a worker who is repeatedly performing a predetermined type of operations (hereinafter referred to as "routine operations"), thereby creating continuous operation data. As used herein, the continuous operation data refers to data representing a time series variation in the location(s) of one or more points set on the body of the worker.

The moving picture processor 10 includes a moving picture acquirer 11, an operation data extractor 12, and a continuous operation data storage device 13.

The moving picture acquirer 11 acquires moving picture data by shooting a worker who is performing the routine operations repeatedly.

The operation data extractor 12 extracts, from the moving picture data, respective locations of points set on the body of the worker. More specifically, the operation data extractor 12 extracts, from each frame of the moving picture data acquired by the moving picture acquirer 11, information representing the respective locations of the points set on the body of the worker. The information representing the respective locations of the points set on the body of the worker may be, for example, two-dimensional coordinates indicating the locations of respective point images within the frame of the moving picture data. Alternatively, the information representing the respective locations of the points set on the body of the worker may also be three-dimensional coordinates indicating the locations of the respective points set on the body of the worker.

Figure 2:
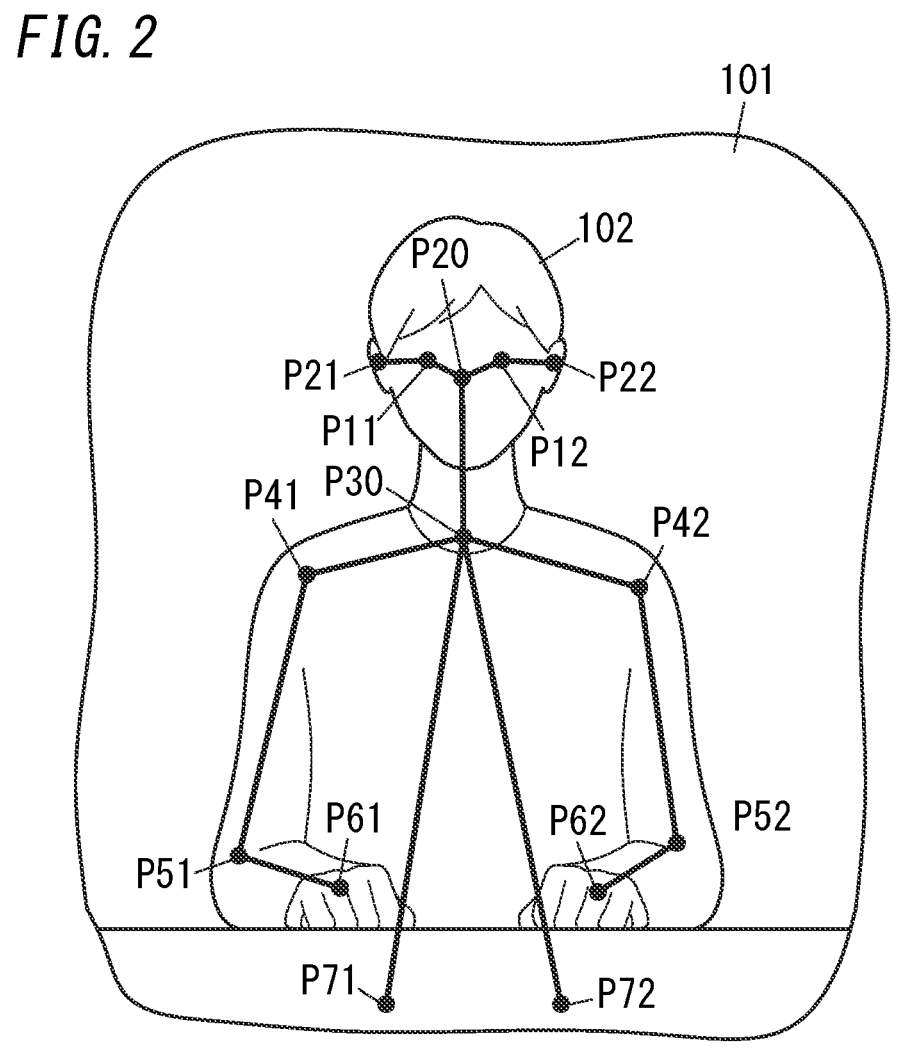

FIG. 2 is a schematic representation showing generally how the operation data extractor 12 performs the operation of detecting respective locations of multiple points set on the body of the worker. The operation data extractor 12 may detect, for example, the locations (sets of coordinates) of multiple points (feature points) set on his or her body to evaluate the body motion of the worker who is performing the operations. The operation data extractor 12 may perform, for example, skeleton detection based on a machine learning model. In the example shown in FIG. 2, the operation data extractor 12 performs skeleton detection on a person's picture 102 included in the moving picture frame 101, thereby detecting fourteen feature points. The fourteen feature points are a right eye point P11, a left eye point P12, a right ear point P21, a left ear point P22, a nose point P20, a neck point P30, a right shoulder point P41, a left shoulder point P42, a right elbow point P51, a left elbow point P52, a right wrist point P61, a left wrist point P62, a right waist point P71, and a left waist point P72. The operation data extractor 12 detects the coordinates of one or more feature points. The feature point, of which the coordinates are to be detected, is preferably a feature point corresponding to a region that moves as the worker performs the routine operations. The operation data extractor 12 may detect, for example, the coordinates of two points set on the right and left wrists. The coordinates to extract are x and y coordinates of the feature point in each frame of the moving picture.

The operation data extractor 12 associates, with respect to each point set on the body of the worker, a time when each frame of the moving picture is acquired with the coordinates of the point in the frame and stores data about the association between the time and the coordinates as continuous operation data in the continuous operation data storage device 13. For example, if the feature points to be subjected to the coordinate detection are set on the right and left wrists, respectively, then the continuous operation data includes a plurality of coordinate values associated with multiple times with respect to each of the x and y coordinates of the point set on right wrist and x and y coordinates of the point set on the left wrist.

(2) Work Data Generator

The operation data generator 20 divides the continuous operation data into multiple operation data sets, each representing a time series variation in respective locations of the points set on the body of the worker in one cycle.

As used herein, the "one cycle" refers to one cycle of operations defined by operation instructions as a repeat unit of the routine operations. For example, if the routine operations are assembly operations on a line, one cycle of the routine operations includes the tasks of: receiving a work target passed from the previous process step; attaching a part to the work target; and passing the work target, to which the part has been attached, to the next process step. Note that the one cycle only needs to be a repeat unit of the routine operations and is not necessarily the minimum repeat unit of the routine operations. For example, if the operation instructions define the operation of assembling two products of the same model as a repeat unit, then one cycle is not operations to be performed on a single product but operations to be performed on the two products.

As used herein, the operation instructions refer to data specifying the order in which respective operations should be performed in one cycle of the routine operations and the standard amounts of time required to have the respective operations done. That is to say, the standard amounts of time refer to the target amounts of time within which the person who determined the operating procedure believes the respective operations should be finished. The operation instructions may be, for example, a manual distributed to assembly line workers. However, this is only an example and should not be construed as limiting. Rather, the operation instructions may be any other type of data as long as the operation instructions specify the total number of operations to be done in one cycle of the operations and standard amounts of time required to have the respective operations done and are not necessarily papers including detailed description of the respective operations. Also, the standard amounts of time required to have the respective operations done do not have to be defined in absolute time such as seconds or minutes but only need to indicate the ratio of the amounts of time required in one cycle of the operations.

The operation data generator 20 includes a continuous operation data acquirer 21 and an operation data divider 22.

The continuous operation data acquirer 21 reads out the continuous operation data from the continuous operation data storage device 13 and outputs the continuous operation data to the operation data divider 22.

The operation data divider 22 detects the start time and end time of one cycle of the routine operations and divides, based on the start and end times, the continuous operation data into multiple operation data sets. The operation data divider 22 according to this embodiment corresponds to the second divider. The start and end times of one cycle of the routine operations may be based, for example, on the operation log of a conveyor. For example, if the conveyor is configured to run only while a work target is put on the conveyor, then the conveyor stops running when the worker receives the work target from the conveyor to start performing the routine operations for one cycle. After that, when the worker finishes performing the operations for one cycle and puts the work target on the conveyor, the conveyor resumes running. That is to say, the start time of one cycle of the routine operations corresponds to the operation stop time of the conveyor and the end time of one cycle of the routine operations corresponds to the operation start time of the conveyor.

Figures 3A, 3B:
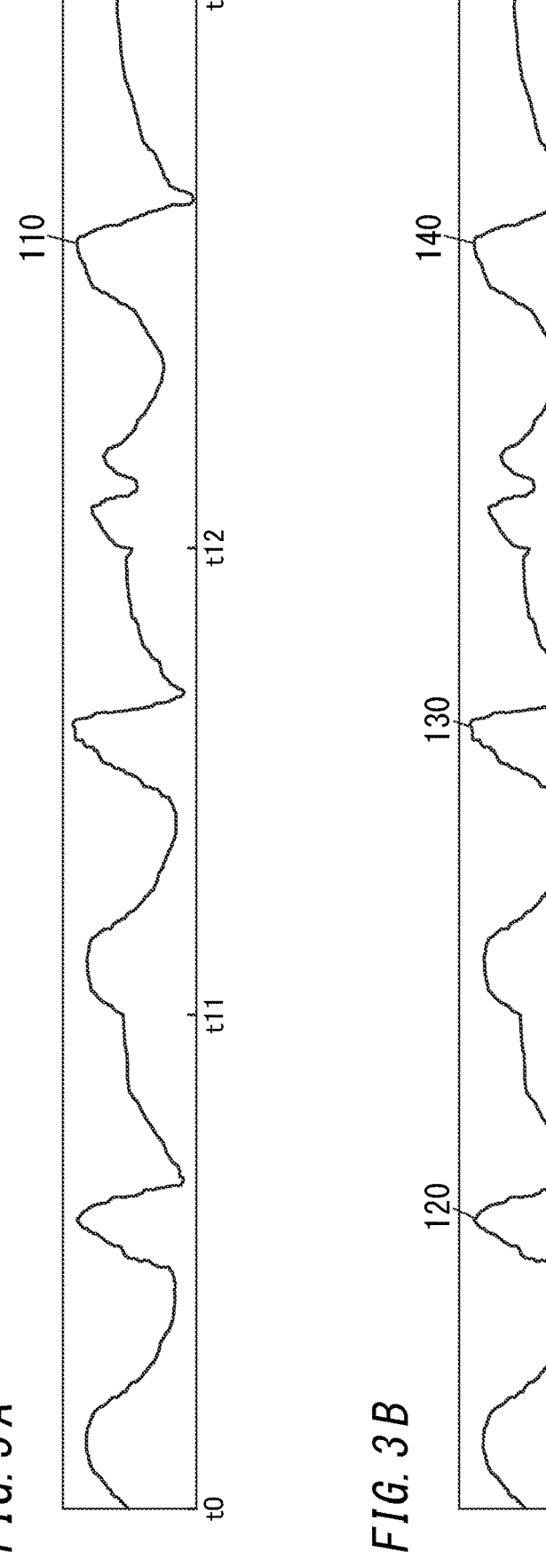
FIG. 3A is a graph showing an example of continuous operation data for use in the operations management system.
FIG. 3B is a graph showing an example of operation data as a division of the continuous operation data shown in FIG. 3A.

FIG. 3A shows continuous operation data 110 representing a time series variation of the x coordinate value of a right wrist point from a time 0 through a time t1. In this case, the start times of one cycle of the routine operations defined by the conveyor's operation are the times t0, t11, and t12 and the end times of one cycle of the routine operations are the times t11, t12, and t1. In this case, the operation data divider 22 outputs, as an operation data set 120, data representing a time series variation of the x coordinate value of the right wrist point from the time 0 through the time t1 as shown in FIG. 3B. In addition, the operation data divider 22 also outputs, as an operation data set 130, data representing a time series variation of the x coordinate value of the right wrist point from the time t1 through the time t12. Furthermore, the operation data divider 22 also outputs, as an operation data set 140, data representing a time series variation of the x coordinate value of the right wrist point from the time t2 through the time t1.

Note that if the continuous operation data includes the coordinates of multiple points (feature points) set on the body of the worker, each operation data set also includes the coordinates of the multiple points (feature points) on the worker's body. Likewise, if the continuous operation data includes multiple coordinate components with respect to a single feature point, then each operation data set also includes multiple coordinate components with respect to the single feature point. Furthermore, if an operation data set includes the coordinates of multiple points (feature points) set on the body of the worker, then the period corresponding to one cycle of the routine operations is the same with respect to any of the multiple feature points.

(3) Work Data Storage Device

The operation data storage device 30 is a storage medium that stores multiple operation data sets associated with a single series of routine operations. The operation data storage device 30 according to this embodiment corresponds to the storage device. The multiple operation data sets include a first operation data set and a second operation data set.

(4) Partial Data Generator

The partial data generator 40 divides each of the multiple operation data sets into a plurality of partial data. The partial data generator 40 includes a partial data divider 41, a degree of similarity calculator 42, and an estimator 43.

(4.1) Partial Data Divider

The partial data divider 41 divides each of the multiple operation data sets into a plurality of partial data. The partial data divider 41 according to this embodiment corresponds to the first divider.

As used herein, the partial data refers to data representing a time series variation in respective locations of multiple points set on the body of the worker and associated with multiple tasks included in one cycle of the routine operations. For example, if the routine operations are assembly operations on a line, then the multiple tasks include: receiving a work target passed from the previous process step; attaching a part to the work target; and passing the work target, to which the part has been attached, to the next process step.

The partial data divider 41 sets one or more division points with respect to the operation data in accordance with the operation instructions. The one or more division points may be set to, for example, make the ratio of the respective time lengths of the plurality of partial data, divided from a single operation data set, equal to the ratio of standard amounts of time required to have the respective tasks done as defined by the operation instructions. One cycle of the routine operations as defined by the operation instructions may include, for example, first, second, third, and fourth tasks. Also, the respective standard amounts of time required to have the first, second, third, and fourth tasks done as defined by the operation instructions may be, for example, 20 seconds, 30 seconds, 30 seconds, and 20 seconds, respectively. In that case, the partial data divider 41 divides each operation data set into four partial data to make the ratio of the respective time lengths of the periods 20:30:30:20.

Figure 4A:
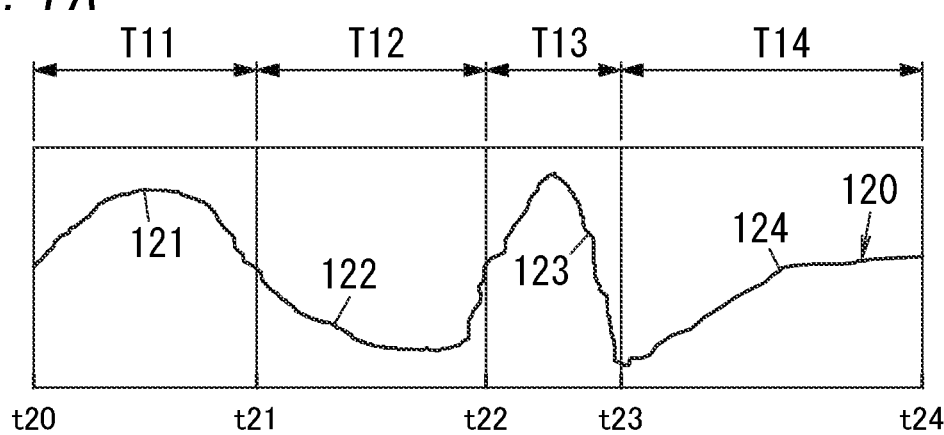
FIG. 4A is a graph showing an example of operation data and partial data for use in the operations management system.

The partial data divider 41 divides the operation data set 120 into four partial data 121-124 as shown in FIG. 4A. Specifically, the partial data 121 is associated with the first task and its period T11 begins at a start time t20 of the operation data set 120 and ends at a division point t21. The partial data 122 is associated with the second task and its period T12 begins at the division point t21 and ends at a division point t22. The partial data 123 is associated with the third task and its period T13 begins at the division point t22 and ends at a division point t23. The partial data 124 is associated with the fourth task and its period T14 begins at the division point t23 and ends at an end time t24 of the operation data set 120. These division points t21, t22, and t23 are set to make the ratio of the respective lengths of the periods T11, T12, T13, and T14 equal to the ratio of the respective standard amounts of time required to have the first, second, third, and fourth tasks done as defined by the operation instructions.

Figure 4B:
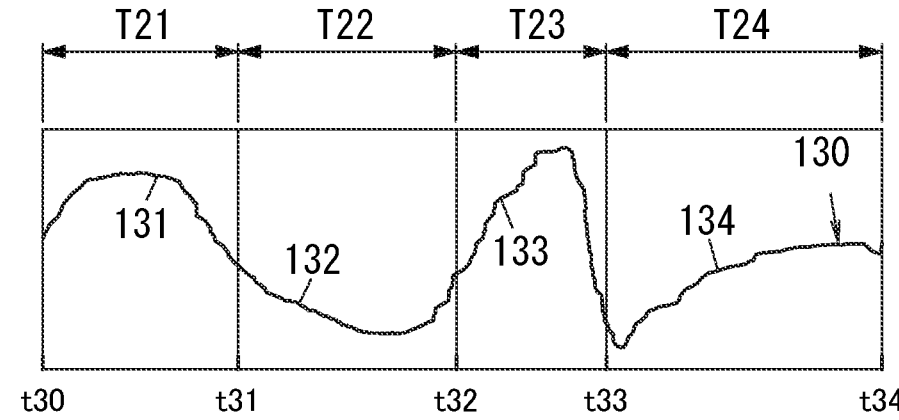
FIG. 4B is a graph showing an example of operation data and partial data for use in the operations management system.

In the same way, the partial data divider 41 also divides an operation data set 130 into four partial data 131-134 as shown in FIG. 4B. Specifically, the partial data 131 is associated with the first task and its period T21 begins at a start time t30 of the operation data set 130 and ends at a division point t31. The partial data 132 is associated with the second task and its period T22 begins at the division point t31 and ends at a division point t32. The partial data 133 is associated with the third task and its period T23 begins at the division point t32 and ends at a division point t33. The partial data 134 is associated with the fourth task and its period T24 begins at the division point t33 and ends at an end time t34 of the operation data set 130. These division points t31, t32, and t33 are set to make the ratio of the respective lengths of the periods T21, T23, T23, and T24 equal to the ratio of the respective standard amounts of time required to have the first, second, third, and fourth tasks done as defined by the operation instructions.

Figure 4C:
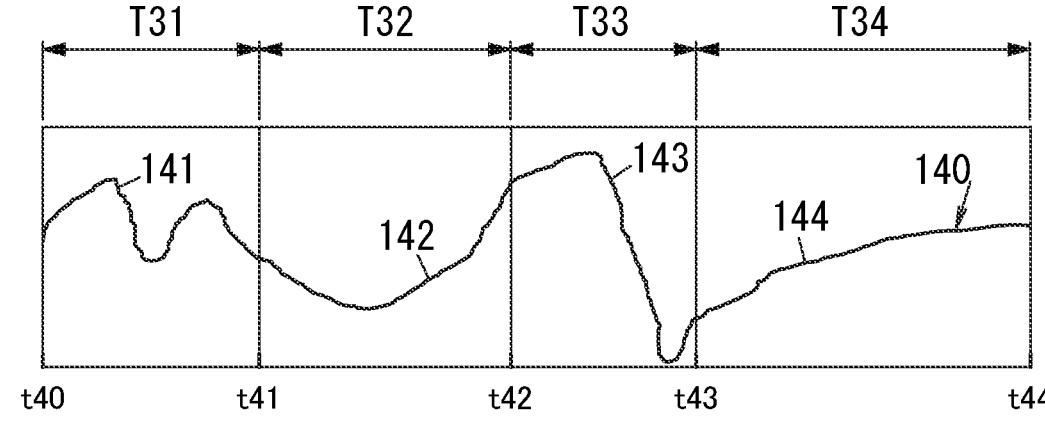
FIG. 4C is a graph showing an example of operation data and partial data for use in the operations management system.

In the same way, the partial data divider 41 also divides an operation data set 140 into four partial data 141-144 as shown in FIG. 4C. Specifically, the partial data 141 is associated with the first task and its period T31 begins at a start time t40 of the operation data set 140 and ends at a division point t41. The partial data 142 is associated with the second task and its period T32 begins at the division point t41 and ends at a division point t42. The partial data 143 is associated with the third task and its period T33 begins at the division point t42 and ends at a division point t43. The partial data 144 is associated with the fourth task and its period T34 begins at the division point t43 and ends at an end time t44 of the operation data set 140. These division points t41, t42, and t43 are set to make the ratio of the respective lengths of the periods T31, T33, T33, and T34 equal to the ratio of the respective standard amounts of time required to have the first, second, third, and fourth tasks done as defined by the operation instructions.

Note that when the estimator 43 (to be described later) sets division points, the partial data divider 41 divides the operation data set into partial data again at the division points that have been set by the estimator 43.

(4.2) Degree of Similarity Calculator 42

The degree of similarity calculator 42 calculates the degree of similarity between a pair of corresponding partial data belonging to multiple operation data sets. More specifically, the degree of similarity calculator 42 calculates the degree of similarity between partial data associated with one task included in one cycle of the routine operations and partial data associated with the corresponding task included in another cycle of the routine operations. As used herein, partial data associated with one task included in one cycle of the routine operations corresponds to the first partial data while partial data associated with a corresponding task included in another cycle of the routine operations corresponds to the second partial data. A plurality of first partial data are obtained by dividing the first operation data set. A plurality of second partial data are obtained by dividing the second operation data set. In addition, the degree of similarity calculator 42 also calculates, with respect to every one of the multiple tasks included in one cycle of the routine operations, the degree of similarity between partial data associated with each of the multiple tasks included in the one cycle of the routine operations and partial data associated with the corresponding task included in another cycle of the routine operations. Then, the degree of similarity calculator 42 calculates, as a degree of operation data set similarity, the sum of the respective degrees of similarity thus calculated between the partial data associated with the respective tasks included in the one cycle of the routine operations and the partial data associated with the corresponding tasks included in another cycle of the routine operations.

The degree of similarity calculator 42 calculates, for example, a degree of similarity between the partial data 121 and the partial data 131. Each of the partial data 121 and the partial data 131 is associated with the first task. Meanwhile, one cycle of the routine operations associated with the partial data 121 and one cycle of the routine operations associated with the partial data 131 are different from each other. As used herein, the degree of similarity refers to a numerical value indicating, with respect to two or more data sets, how similar the waveforms drawn by these data sets are. For example, the degree of similarity may be obtained by equalizing the number of samples that form the partial data 121 on the time axis with the number of samples that form the partial data 131 on the time axis by performing interpolation processing and then calculating the degree of cosine similarity between these partial data 121, 131. In the case of cosine similarity, the higher the degree of similarity of the waveforms is, the larger the numerical value is. Note that the degree of cosine similarity is only an example of the degree of similarity. Rather, any other technique may also be used as long as the technique allows the difference between multiple data waveforms to be expressed as a numerical value.

In the same way, the degree of similarity calculator 42 calculates, for example, a degree of similarity between the partial data 122 and the partial data 132. Each of the partial data 122 and the partial data 132 is associated with the second task. Meanwhile, one cycle of the routine operations associated with the partial data 122 and one cycle of the routine operations associated with the partial data 132 are different from each other.

In the same way, the degree of similarity calculator 42 calculates, for example, a degree of similarity between the partial data 123 and the partial data 133. Each of the partial data 123 and the partial data 133 is associated with the third task. Meanwhile, one cycle of the routine operations associated with the partial data 123 and one cycle of the routine operations associated with the partial data 133 are different from each other.

In the same way, the degree of similarity calculator 42 calculates, for example, a degree of similarity between the partial data 124 and the partial data 134. Each of the partial data 124 and the partial data 134 is associated with the fourth task. Meanwhile, one cycle of the routine operations associated with the partial data 124 and one cycle of the routine operations associated with the partial data 134 are different from each other.

The degree of similarity calculator 42 further calculates the degree of operation data set similarity. As used herein, the degree of operation data set similarity refers to the sum of the respective degrees of similarity between a plurality of partial data associated with multiple tasks included in one cycle of the routine operations (i.e., included in one operation data set) and partial data associated with the corresponding tasks included in another cycle of the routine operations. For example, the degree of operation data set similarity of the operation data set 130 is the sum of the respective degrees of similarity calculated with respect to the partial data 131, the partial data 132, the partial data 133, and the partial data 134 included in the operation data set 130. More specifically, the degree of operation data set similarity of the operation data set 130 is the sum of the degree of similarity between the partial data 121 and the partial data 131, the degree of similarity between the partial data 122 and the partial data 132, the degree of similarity between the partial data 123 and the partial data 133, and the degree of similarity between the partial data 124 and the partial data 134.

In the same way, the degree of similarity calculator 42 calculates the degree of operation data set similarity of the operation data set 140 as the sum of the degree of similarity between the partial data 121 and the partial data 141, the degree of similarity between the partial data 122 and the partial data 142, the degree of similarity between the partial data 123 and the partial data 143, and the degree of similarity between the partial data 124 and the partial data 144.

In addition, the degree of similarity calculator 42 further calculates, as the degree of operation data set similarity of the operation data set 120, the sum of the degree of operation data set similarity of the operation data set 130 and the degree of operation data set similarity of the operation data set 140.

Note that if the operation data set and partial data each include the coordinates of multiple points set on a person, then the degree of similarity calculator 42 calculates the degree of similarity between the partial data with respect to each of the multiple points set on the person and regards, as the degree of similarity between the partial data, the sum of the respective degrees of similarity calculated with respect to the multiple points. For example, if each of the partial data 121 and the partial data 131 includes the coordinates of a right wrist point and the coordinates of a left wrist point, then the degree of similarity calculator 42 calculates the degree of similarity between the partial data 121 and the partial data 131 with respect to the coordinates of the right wrist point. In addition, the degree of similarity calculator 42 also calculates the degree of similarity between the partial data 121 and the partial data 131 with respect to the coordinates of the left wrist point. Then, the degree of similarity calculator 42 regards the sum of the degree of similarity with respect to the coordinates of the right wrist point and the degree of similarity with respect to the coordinates of the left wrist point as the degree of similarity between the partial data 121 and the partial data 131.

Furthermore, if the operation data set and partial data each include the coordinates of a point as a combination of multiple components, then the degree of similarity calculator 42 calculates the degree of similarity between the partial data with respect to each of the multiple components and regards the sum of the respective degrees of similarity as the degree of similarity between the partial data. For example, if the partial data 121 and the partial data 131 each include the coordinates of a right wrist point as a combination of x and y coordinates, the degree of similarity calculator 42 calculates the degree of similarity between the partial data 121 and the partial data 131 with respect to the x coordinate of the right wrist point. In addition, the degree of similarity calculator 42 also calculates the degree of similarity between the partial data 121 and the partial data 131 with respect to the y coordinate of the right wrist point. Then, the degree of similarity calculator 42 regards the sum of the degree of similarity calculated with respect to the x coordinate of the right wrist point and the degree of similarity calculated with respect to the y coordinate of the right wrist point as the degree of similarity between the partial data 121 and the partial data 131 with respect to the right wrist point.

(4.3) Estimator

The estimator 43 estimates, based on the degree of operation data set similarity, one or more division points at which the operation data set associated with the degree of operation data set similarity is divided into multiple partial data. The operation data set associated with the degree of operation data set similarity corresponds to the first operation data set.

The estimator 43 acquires, with respect to each operation data set, the division points from the partial data divider 41. In addition, the estimator 43 also acquires, with respect to each operation data set, the degree of operation data set similarity associated with the operation data set from the degree of similarity calculator 42. Next, the estimator 43 changes the locations of the division points with respect to the operation data set, makes the partial data divider 41 newly generate partial data, and then makes the degree of similarity calculator 42 calculate the degree of operation data set similarity based on the newly generated partial data. Then, the estimator 43 estimates, with respect to the operation data set, the locations of division points where the degree of operation data set similarity is maximized based on the correlation between the locations of the division points and the degree of operation data set similarity. As a result, the division point is set, with respect to each operation data set, at a point in time corresponding to the same degree of progress in one cycle of the routine operations. For example, if a division point is estimated at the boundary between the first and second tasks with respect to one operation data set, then the division point is also estimated at the boundary between the first and second tasks with respect to another operation data set as well.

Figure 5A:
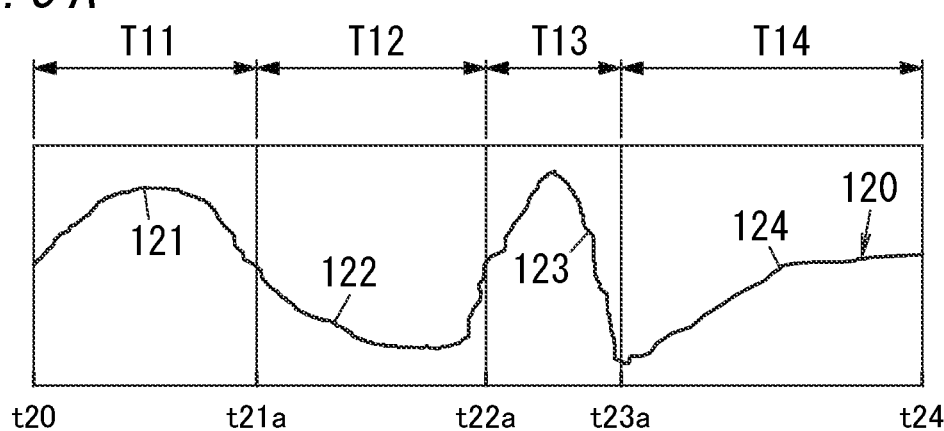
FIG. 5A is a graph showing an example of operation data and division points for use in the operations management system.

The estimator 43 may change, for example, at least one of the division points t21, t22, and t23 with respect to the operation data set 120 and makes the partial data divider 41 regenerate the partial data 121-124. In addition, the estimator 43 also makes the degree of similarity calculator 42 calculate the degree of operation data set similarity of the operation data set 120 based on the partial data 121-124 that have been regenerated by the partial data divider 41 and acquires the degree of operation data set similarity thus calculated. Then, the estimator 43 estimates, based on the correlation between the respective times of the division points t21, t22, and t23 and the degree of operation data set similarity of the operation data set 120, the division points t21a, t22a, and t23a where the degree of operation data set similarity of the operation data set 120 is maximized as shown in FIG. 5A. More specifically, the estimator 43 calculates, by Bayesian optimization using the respective times of the division points of the operation data set 120 and the degree of operation data set similarity of the operation data set 120 associated with the division points, a potential division point where the degree of operation data set similarity of the operation data set 120 is maximized. If the estimator 43 acquires multiple degrees of operation data set similarity of the operation data set 120, the estimator 43 makes a first decision about whether the difference between the maximum value of the degree of operation data set similarity of the operation data set 120 and the second largest value of the degree of operation data set similarity of the operation data set 120 is equal to or less than a predetermined threshold value. In addition, the estimator 43 also makes a second decision about whether the time lag between the division point associated with the maximum value of the degree of operation data set similarity and the division point associated with the second largest value of the degree of operation data set similarity is less than a predetermined time lag. If the answers to the first and second decisions are both YES, then the estimator 43 decides that the potential division point has been searched for sufficiently and estimates the division points corresponding to the maximum value of the degree of operation data set similarity to be the division points t21a, t22a, and t23a.

Figure 5B:
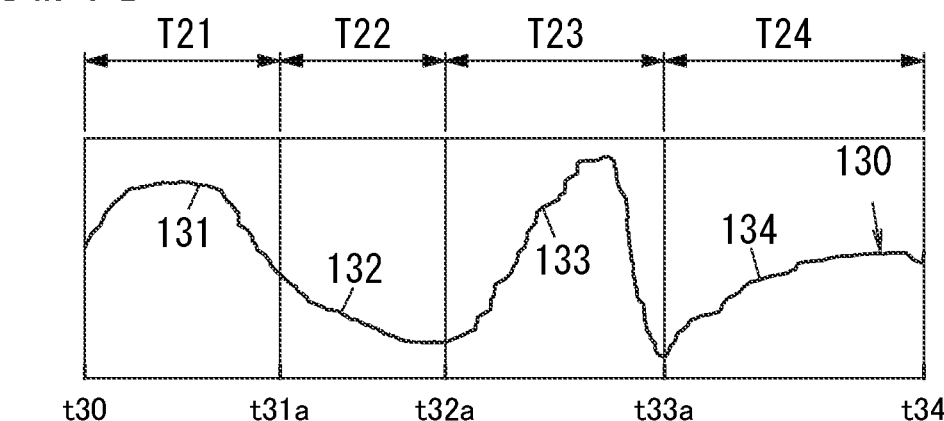
FIG. 5B is a graph showing an example of operation data and division points for use in the operations management system.

Next, the estimator 43 changes the division points t31, t32, and t33 with respect to the operation data set 130, makes the partial data divider 41 regenerate the partial data 131-134, and acquires the degree of operation data set similarity of the operation data set 130 from the degree of similarity calculator 42. Then, the estimator 43 estimates, based on the correlation between the respective times of the division points t31, t32, and t33 and the degree of operation data set similarity of the operation data set 130, the division points t31a, t32a, and t33a where the degree of operation data set similarity of the operation data set 130 is maximized as shown in FIG. 5B.

Figure 5C:
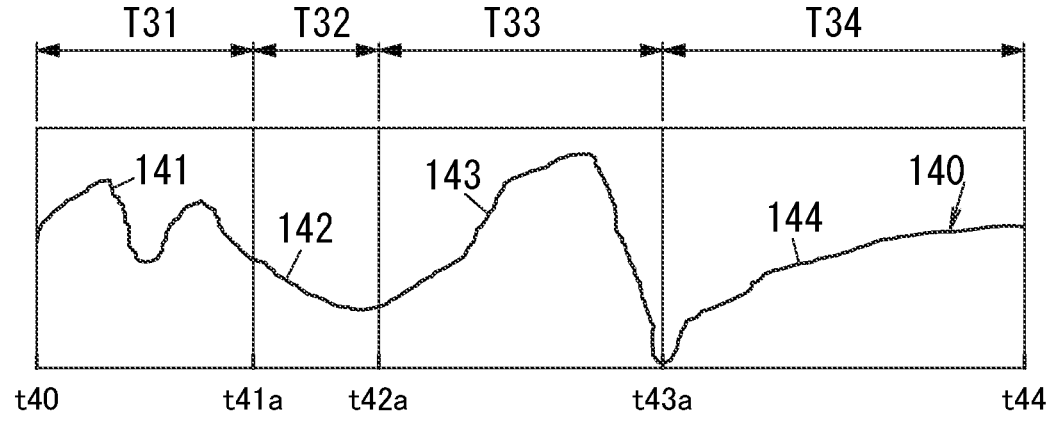
FIG. 5C is a graph showing an example of operation data and division points for use in the operations management system.

Next, the estimator 43 changes the division points t41, t42, and t43 with respect to the operation data set 140, makes the partial data divider 41 regenerate the partial data 141-144, and acquires the degree of operation data set similarity of the operation data set 140 from the degree of similarity calculator 42. Then, the estimator 43 estimates, based on the correlation between the respective times of the division points t41, t42, and t43 and the degree of operation data set similarity of the operation data set 140, the division points t41a, t42a, and t43a where the degree of operation data set similarity of the operation data set 140 is maximized as shown in FIG. 5C.

On estimating the division points of each operation data set, the estimator 43 makes the partial data divider 41 divide the operation data set at the division points thus estimated. Meanwhile, the degree of similarity calculator 42 calculates, with respect to each of the partial data that have been divided at the division points estimated by the estimator 43, the degree of similarity to the partial data associated with the corresponding process step in another cycle of the routine operations.

(5) Evaluator

The evaluator 50 determines, based on the partial data that has been divided at the division points estimated by the estimator 43, whether the worker has appropriately performed the task associated with the partial data.

For example, when finding the degree of similarity between particular partial data and partial data associated with the corresponding task in another cycle of the routine operations low, the evaluator 50 decides that the worker may have inappropriately performed the task associated with the particular partial data. The reason is that the worker has performed the task associated with the particular partial data differently from the corresponding task in any other cycle of the routine operations, and therefore, is highly likely to have failed to perform that task as per the operation instructions. This allows the evaluator 50 to detect the task that the worker has failed to perform as per the operation instructions.

Also, when finding the time length of particular partial data longer than the standard amount of time required to have the associated task done in accordance with the operation instructions, for example, the evaluator 50 decides that a delay have been caused in that task. Note that when finding the time length of partial data associated with a particular task always longer than the standard amount of time required to have the task done, for example, the evaluator 50 may presume that the worker's skills will be low or that the degree of difficulty of the task will be high. Furthermore, when finding the time length of partial data in one particular cycle longer than the time length of partial data associated with the corresponding task in another cycle, the evaluator 50 may presume that the worker has failed to perform the task of the particular cycle in accordance with the operation instructions.

3. Operation (1) Operation of Operations Management System

Figure 6:
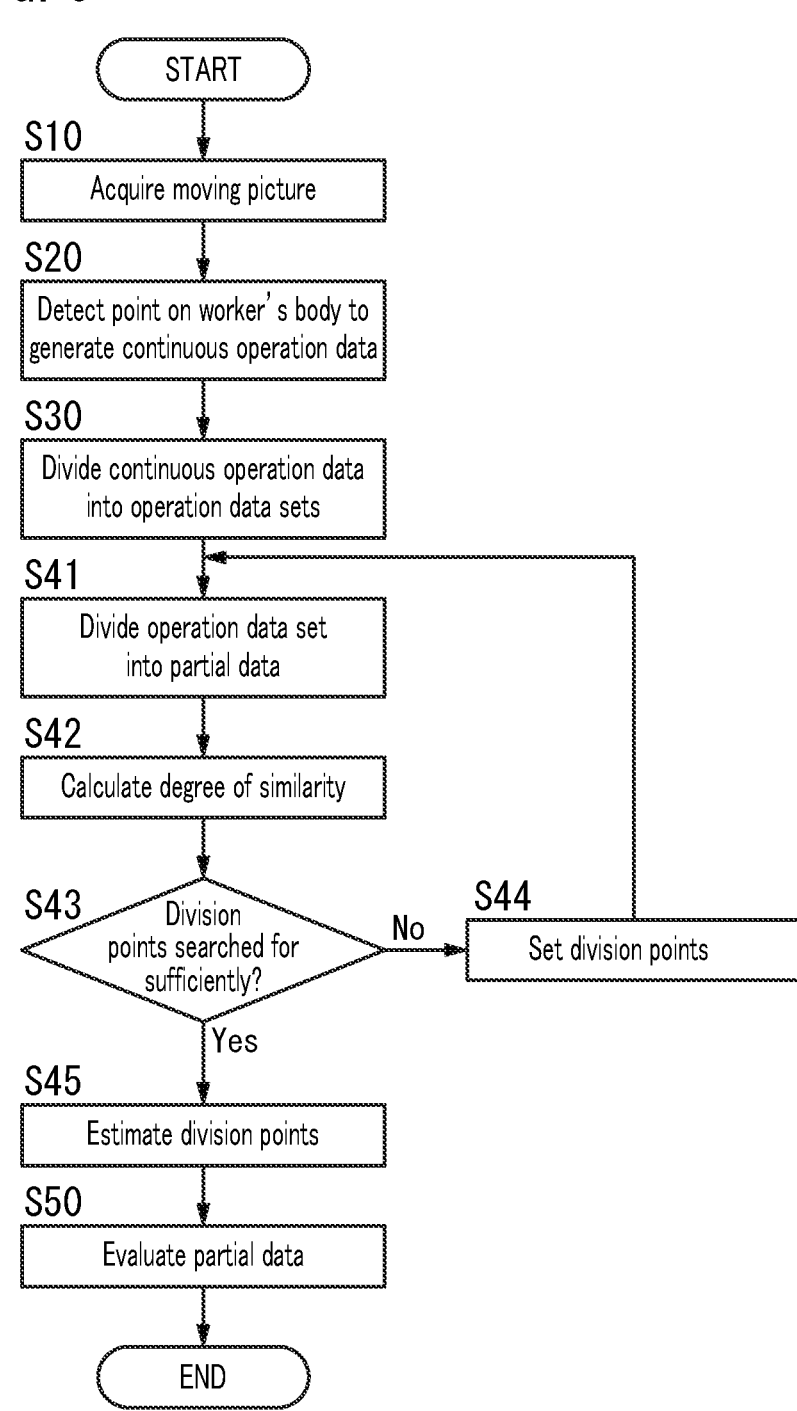
FIG. 6 is a flowchart showing an operating procedure of the operations management system.

FIG. 6 is a flowchart showing how the operations management system 1 according to the first embodiment operates.

First, the moving picture acquirer 11 of the operations management system 1 acquires a moving picture (in Step S10). The moving picture acquirer 11 acquires a moving picture by shooting a worker who is performing routine operations repeatedly.

Next, the operation data extractor 12 of the operations management system 1 detects points set on the body of the worker to generate continuous operation data (in Step S20). The operation data extractor 12 performs skeleton detection based on a machine learning model on each frame of the moving picture to extract one or more feature points on the basis of each frame of the moving picture. The operation data extractor 12 associates a time when each frame of the moving picture is acquired with the coordinates of a feature point and stores data about their association in the continuous operation data storage device 13.

Subsequently, the operation data generator 20 of the operations management system 1 divides the continuous operation data into multiple operation data sets (in Step S30). The continuous operation data acquirer 21 of the operation data generator 20 reads out the continuous operation data from the continuous operation data storage device 13. Next, the operation data divider 22 of the operation data generator 20 extracts, by reference to the start and end times of each cycle of the routine operations, an operation data set for each cycle of the routine operations from the continuous operation data. More specifically, the operation data divider 22 extracts an operation data set 120, an operation data set 130, and an operation data set 140 from the continuous operation data 110 as shown in FIGS. 3A and 3B. The operation data set 120 is associated with a period from a time t0 through a time t11. The operation data set 130 is associated with a period from the time t1 through a time t12. The operation data set 140 is associated with a period from the time t12 through a time t1. The operation data divider 22 stores these operation data sets in the operation data storage device 30.

Next, the partial data divider 41 of the operations management system 1 divides each of these operation data sets into partial data (in Step S41). When performing this Step S41 for the first time, the partial data divider 41 sets the division points to make the ratio of the respective time lengths of the plurality of partial data divided from a single operation data set equal to the ratio of the standard amounts of time required to have the respective tasks done as defined by the operation instructions. Specifically, as shown in FIG. 4A, the partial data divider 41 sets division points t21, t22, and t23 to make the ratio of the respective lengths of the periods T11, T12, T13, and T14 of the operation data set 120 equal to the ratio of the standard amounts of time required to perform the four process steps included in one cycle of the routine operations. The partial data divider 41 divides the operation data set 120 into partial data 121, 122, 123, and 124 at the division points t21, t22, and t23.

Next, the degree of similarity calculator 42 of the operations management system 1 calculates the degree of similarity about the operation data set (in Step S42). More specifically, the degree of similarity calculator 42 calculates the degree of similarity between partial data associated with one process step in one cycle of the routine operations and partial data associated with the corresponding process step in another cycle of the routine operations. In addition, the degree of similarity calculator 42 also calculates, with respect to every one of the multiple process steps included in one cycle of the routine operations, the degree of similarity between partial data associated with each of the multiple process steps included in the one cycle of the routine operations and partial data associated with the corresponding process step included in another cycle of the routine operations. Then, the degree of similarity calculator 42 calculates, as a degree of operation data set similarity, the sum of the respective degrees of similarity thus calculated between the partial data associated with the respective process steps included in the one cycle of the routine operations and the partial data associated with the corresponding process steps included in another cycle of the routine operations. For example, the degree of similarity calculator 42 calculates a degree of similarity between the partial data 121 and the partial data 131 as shown in FIGS. 4A and 4B. The degree of similarity calculator 42 also calculates a degree of similarity between the partial data 122 and the partial data 132. The degree of similarity calculator 42 further calculates a degree of similarity between the partial data 123 and the partial data 133. The degree of similarity calculator 42 further calculates a degree of similarity between the partial data 124 and the partial data 134. The degree of similarity calculator 42 further calculates, as the degree of operation data set similarity of the operation data set 130, the sum of these four degrees of similarity. It will be described later how to select the target for which the degree of similarity is calculated.

Next, the estimator 43 of the operations management system 1 determines whether the division points have been searched for sufficiently (in Step S43). When the estimator 43 performs this Step S43 for the first time, the answer is NO, and the process proceeds to Step S44.

Subsequently, the estimator 43 of the operations management system 1 sets the division points (in Step S44). The estimator 43 may estimate the division points of the operation data set by Bayesian optimization, for example. When performing this Step S44 for the first time, no data is available for use to make the Bayesian optimization, and therefore, the estimator 43 sets, based on the division points that have been set by the partial data divider 41, new division points by delaying the respective division points by a predetermined time, for example.

Thereafter, the partial data divider 41 of the operations management system 1 divides the operation data set into a plurality of partial data (in Step S41). The partial data divider 41 divides the operation data set into a plurality of partial data at the division points that have been set by the estimator 43 in Step S44.

Next, the degree of similarity calculator 42 of the operations management system 1 calculates the degree of operation data set similarity (in Step S42).

Subsequently, the estimator 43 of the operations management system 1 determines whether the division points have been searched for sufficiently (in Step S43). When the estimator 43 performs this Step S43 for the second time, the answer is NO, and the process proceeds to Step S44.

Then, the estimator 43 of the operations management system 1 sets the division points (in Step S44). The estimator 43 may estimate, based on the division points that have been used in every Step S41 and the degree of operation data set similarity that has been calculated in Step S42 with respect to each division point, the division points of the operation data set by Bayesian optimization.

Thereafter, the partial data divider 41 of the operations management system 1 divides the operation data set into a plurality of partial data (in Step S41). The partial data divider 41 divides the operation data set into a plurality of partial data at the division points that have been set by the estimator 43 in Step S44.

Next, the degree of similarity calculator 42 of the operations management system 1 calculates the degree of similarity of the operation data set (in Step S42).

Subsequently, the estimator 43 of the operations management system 1 determines whether the division points have been searched for sufficiently (in Step S43). The estimator 43 determines whether the difference between the maximum value of the degrees of operation data set similarity that have been calculated in all Steps S42 and the second largest value thereof is equal to or less than a predetermined threshold value. In addition, the estimator 43 also determines whether the time lag between a division point associated with the maximum value of the degree of operation data set similarity and a division point associated with the second largest degree of operation data set similarity is less than a predetermined time lag. When the estimator 43 finds the difference between the maximum value of the degree of operation data set similarity and the second largest value thereof less than the threshold value and also finds the time lag between the division point associated with the maximum value of the degree of operation data set similarity and the division point associated with the second largest degree of operation data set similarity less than the predetermined time lag, the answer is YES in Step S43 and the process proceeds to Step S45. On the other hand, if the estimator 43 finds that neither of these conditions is satisfied, then the answer is NO in Step S43. In that case, Steps S44, S41, and S42 are performed all over again.

If the answer is YES in Step S43, then the estimator 43 of the operations management system 1 estimates division points (in Step S45). The estimator 43 estimates a division point associated with the maximum value of the degree of operation data set similarity as a division point associated with the operation data set. Then, the estimator 43 makes the partial data divider 41 divide the operation data set into multiple partial data at the division points.

Finally, the evaluator 50 of the operations management system 1 makes evaluation based on the partial data (in Step S50). The evaluator 50 determines, based on the time lengths of the partial data and the degree of similarity between partial data and the partial data associated with the corresponding task in another cycle, whether the worker has performed the task as per the operation instructions.

(2) Operation of Calculating Degree of Similarity

Next, it will be described in detail how the degree of similarity calculator 42 may determine a pair of operation data sets, between which the degree of similarity is to be calculated.

FIGS. 7A-7E show operation data sets stored in the operation data storage device 30 about the routine operations that has been performed for an $n^{th}$ time (where n is a natural number). More specifically, FIGS. 7A-7D show (M+1) operation data sets (where M is a natural number and) which are consecutive with each other on the time series and stored in the operation data storage device 30. The (M+1) operation data sets are from the operation data set 81 about the routine operations that has been performed for the $N^{th}$ time (where N is a natural number) through the operation data set 84 about the routine operations that has been performed for the $(N+M)^{th}$ time. Note that FIGS. 7A-7D show only operation data sets where n=N, n=N+1, n=N+2, and n=N+M, respectively, with the other operation data sets (such as an operation data set where n=N+3 and M≥4) not shown. In this case, each of the four operation data sets, namely, from the operation data set 81 for the $N^{th}$ time (hereinafter simply referred to as the "$N^{th}$ operation data set 81") through the $(N+M)^{th}$ operation data set 84, shown in FIGS. 7A-7D has already been divided into partial data. That is to say, the operation data set 81 has already been divided into partial data 811-814. The operation data set 82 has already been divided into partial data 821-824. The operation data set 83 has already been divided into partial data 831-834. The operation data set 84 has already been divided into partial data 841-844.

Next, a situation where the partial data divider 41 has read out an $(N+M+1)^{th}$ operation data set 85 (refer to FIG. 7E) from the operation data storage device 30 will be described. It will be described how to search for an operation data set, for which the degree of similarity needs to be obtained with respect to this operation data set 85. FIG. 8 is a flowchart showing the procedure of determining the degree of similarity.

First, the partial data divider 41 reads out the $(N+M+1)^{th}$ operation data set 85 (hereinafter referred to as a "process target operation data set 85") from the operation data storage device 30 (in Step S91).

Figure 7A:
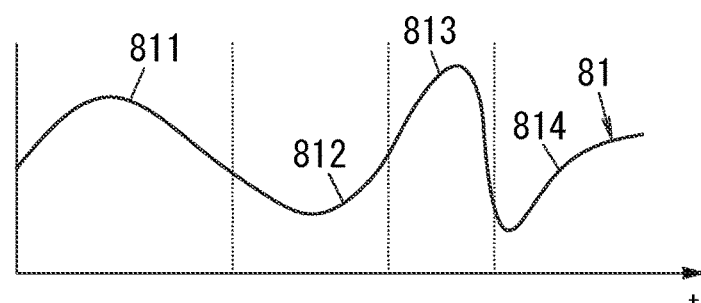
FIG. 7A is a graph showing an example of divided operation data for use in the operations management system.
Figure 7B:
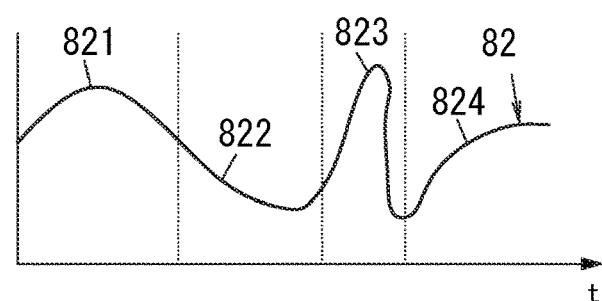
FIG. 7B is a graph showing an example of divided operation data for use in the operations management system.
Figure 7C:
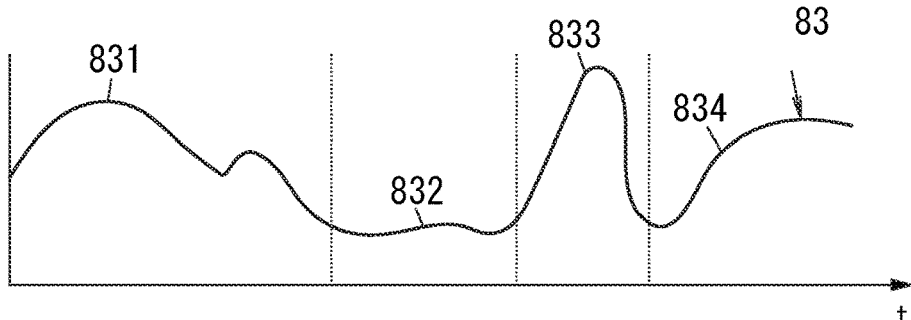
FIG. 7C is a graph showing an example of divided operation data for use in the operations management system.
Figure 7D:
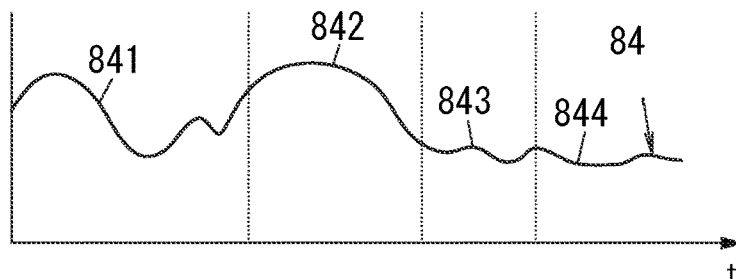
FIG. 7D is a graph showing an example of divided operation data for use in the operations management system.
Figure 7E:
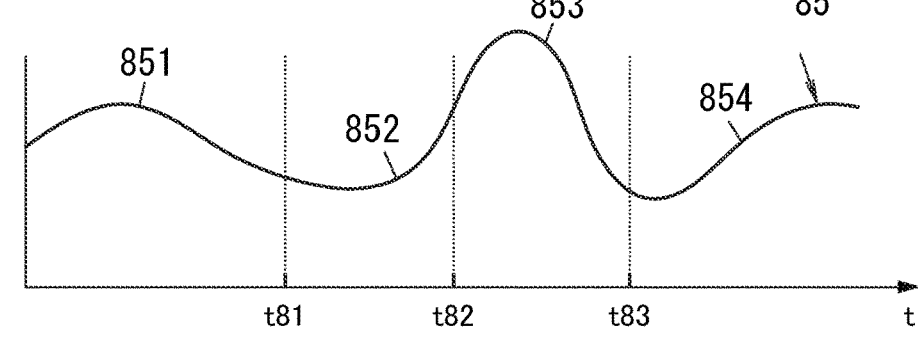
FIG. 7E is a graph showing exemplary of operation data and division points for use in the operations management system.
Figure 8:
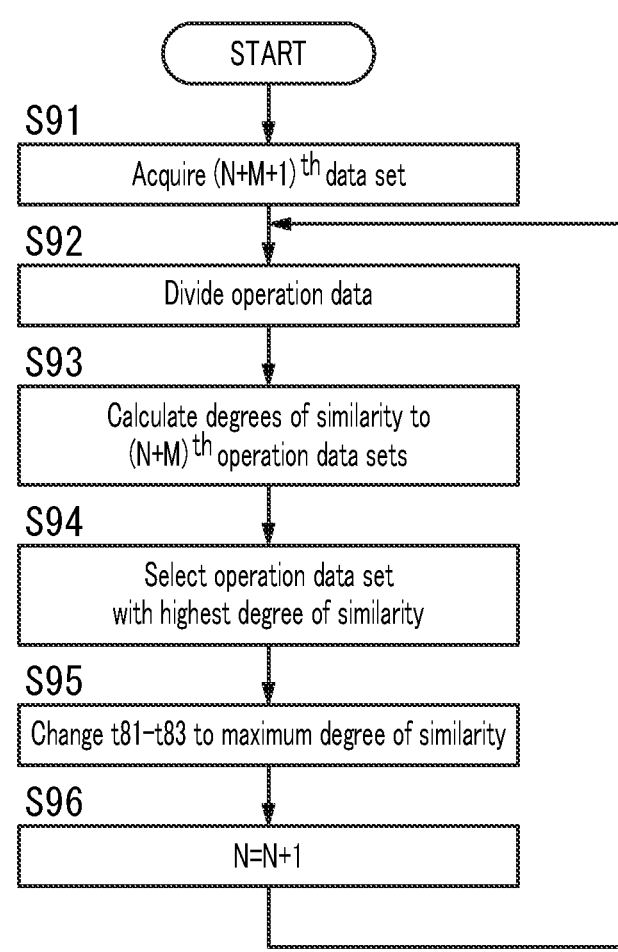
FIG. 8 is a flowchart showing how the operations management system performs the operation of calculating a degree of similarity.

Next, as shown in FIG. 7E, the partial data divider 41 divides the process target operation data set 85 into partial data 851-854 in accordance with the ratio of the respective standard amounts of time required to have the tasks done as defined by the operation instructions. In this case, respective times defining the boundaries between the partial data are supposed to be t81, t82, and t83, respectively. These are initial values for use to divide the process target operation data set 85 into the partial data (in Step S92).

Next, the respective degrees of similarity between the process target operation data set 85 and the $N^{th}$ through $(N+M)^{th}$ operation data sets are calculated (in Step S93).

More specifically, the degree of similarity calculator 42 first calculates the degrees of similarity between the partial data 811-814 included in the $N^{th}$ operation data set 81 and the partial data 851-854 included in the process target operation data set 85. Specifically, the degree of similarity calculator 42 calculates the degree of similarity between the partial data 811 and the partial data 851, the degree of similarity between the partial data 812 and the partial data 852, the degree of similarity between the partial data 813 and the partial data 853, and the degree of similarity between the partial data 814 and the partial data 854, and defines the sum of these values to be the degree of similarity between the $N^{th}$ operation data set 81 and the process target operation data set 85. After that, the degree of similarity calculator 42 will make such calculations (M+1) times in total with respect to the $(N+1)^{th}$ operation data set 82, the $(N+_2)^{th}$ operation data set 83, . . . , and the $(N+M)^{th}$ operation data set 84. As a result, (M+1) degrees of similarity are calculated with respect to the (M+1) operation data sets, namely, from the $N^{th}$ operation data set 81 through the $(N+M)^{th}$ operation data set 84.

The degree of similarity calculator 42 determines an operation data set, associated with the largest degree of similarity among the (M+1) degrees of similarity thus calculated, to be target data. For example, if the degree of similarity between an $L^{th}$ (where L is a natural number equal to or greater than N and equal to or less than N+M) operation data set and the process target operation data set 85 is found to be the highest, then the degree of similarity calculator 42 determines the $L^{th}$ operation data set to be the target data (in Step S94).

Next, the estimator 43 shifts the respective locations of the division points t81-t83, at which the process target operation data set 85 is divided into the partial data, by the method described above, thereby searching for division points t81-t83 where the degree of similarity between the target data and the processing target operation data set 85 becomes highest (in Step S95).

After that, the same series of processing steps will be performed on the newly acquired operation data set as well (in Step S96).

In the example described above, the target data is supposed to be a single operation data set, of which the degree of similarity is the highest at the initial value. However, the target data does not have to be narrowed at a single operation data set. Alternatively, the target data may also be operation data sets, of which the degrees of similarity fall within the range from the highest one through the $K^{th}$ (where K is an integer equal to or less than M+1) highest one. Still alternatively, every operation data set, of which the degree of similarity is equal to or greater than a predetermined threshold value, may also be defined to be the target data.

4. Advantages

The operations management system 1 according to the first embodiment divides an operation data set for one cycle of routine operations into a plurality of partial data in accordance with operation instructions and estimates, based on the degree of similarity between a pair of corresponding partial data associated with the same process step in different cycles, division points where the operation data set is divided into the partial data. The more similarly the worker behaves in the corresponding process step, the higher the degree of similarity between the partial data will be. As a result, each division point is set, with respect to each operation data set, at a timing corresponding to the same point of progress in the process step.

In addition, in the operations management system 1 according to the first embodiment, if the operation data set and partial data each include the coordinates of a point as a combination of multiple components, then the degree of similarity calculator 42 calculates the degree of similarity between the partial data with respect to each of the multiple components and defines the sum of the respective degrees of similarity as the degree of similarity between the partial data. Thus, the more similar the movement of each point set on the body of the worker is between partial data associated with the corresponding process step in two different cycles, the higher the degree of similarity between the partial data will be. This allows, even if the worker moves a different part of his or her body significantly from one task to another, division points, where the operation data set is divided into partial data, to be estimated highly accurately.

Furthermore, the operations management system 1 according to the first embodiment provisionally divides an operation data set for one cycle of routine operations into partial data according to the respective standard amounts of time required to have the respective process steps done and in accordance with the operation instructions. Thus, the partial data that has been provisionally divided has an error at the start and end times thereof but is associated with one of the process steps defined by the operation instructions. Therefore, each division point of the operation data set is highly likely to be associated with one of the process steps defined by the operation instructions. That is to say, the operations management system 1 according to the first embodiment may highly accurately divide the operation data set into partial data on a process step basis even without providing, as comparative data, standard partial data based on the operation instructions.

Second Embodiment

A partial data divider 41 according to a second embodiment performs the partial data division processing differently in the following respects from the counterpart according to the first embodiment. Specifically, the partial data divider 41 according to the second embodiment performs the processing of adjusting the time length of each operation data set before dividing the operation data set into partial data, and then divides the operation data set into partial data in accordance with the operation instructions.

The partial data divider 41 according to the second embodiment adjusts the time length of each operation data set to make the time length of the operation data set equal to the standard amount of time as defined by the operation instructions. The partial data divider 41 increases or decreases the time length of the operating time such that the time lag between the start and end times of the operation data set agrees with the operating time for one cycle of the routine operations as defined by the operation instructions. In addition, the partial data divider 41 also performs either interpolation or decimation on the location of the worker's body to prevent a time interval corresponding to the locations of the worker's body from changing.

Figure 9A:
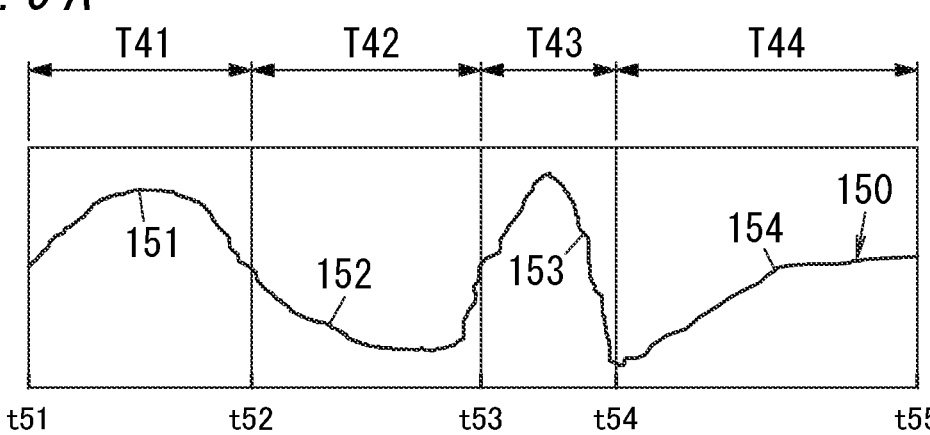
FIG. 9A is a graph showing an example of operation data and partial data for use in an operations management system according to a second embodiment.
Figure 9B:
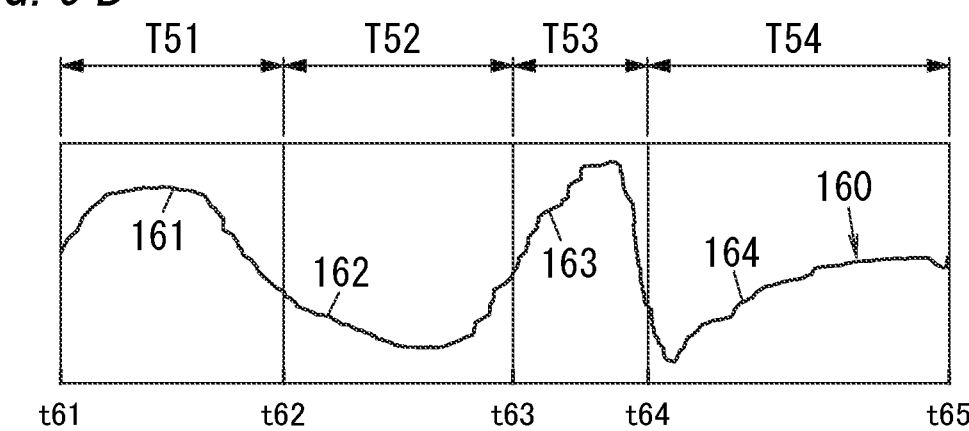
FIG. 9B is a graph showing an example of operation data and partial data for use in the operations management system.
Figure 9C:
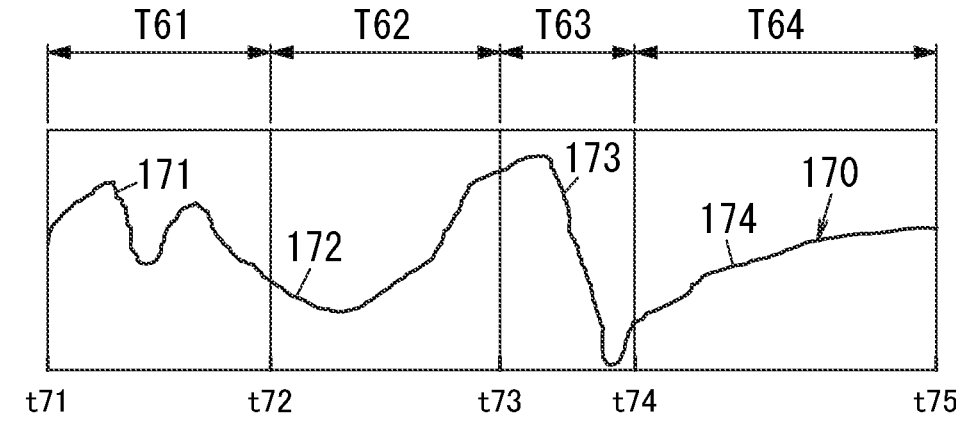
FIG. 9C is a graph showing an example of operation data and partial data for use in the operations management system.

The partial data divider 41 may generate, for example, an operation data set 150 shown in FIG. 9A based on the operation data set 120 shown in FIG. 4A. The time lag between the start time t51 and end time t55 of the operation data set 150 agrees with the operating time of one cycle of routine operations as defined by the operation instructions. The partial data divider 41 may generate, for example, an operation data set 160 shown in FIG. 9B based on the operation data set 130 shown in FIG. 4B. The time lag between the start time t61 and end time t65 of the operation data set 160 agrees with the operating time of one cycle of routine operations as defined by the operation instructions. The partial data divider 41 may generate, for example, an operation data set 170 shown in FIG. 9C based on the operation data set 140 shown in FIG. 4C. The time lag between the start time t71 and end time t75 of the operation data set 170 agrees with the operating time of one cycle of routine operations as defined by the operation instructions. Also, these operation data sets 150, 160, and 170 have the same time length, the same number of locations of the worker's body covered, and the same time interval corresponding to the respective locations of the worker's body.

The partial data divider 41 according to the second embodiment adjusts the time length of an operation data set and then divides the operation data set into partial data in accordance with the operation instructions. More specifically, the partial data divider 41 divides the operation data set into partial data according to the respective standard amounts of time required to have the respective tasks done as defined by the operation instructions. The partial data divider 41 may extract, for example, partial data 151, 152, 153, and 154 from the operation data set 150. The partial data divider 41 may also extract, for example, partial data 161, 162, 163, and 164 from the operation data set 160. The partial data divider 41 may also extract, for example, partial data 171, 172, 173, and 174 from the operation data set 170.

The partial data 151, 161, and 171 are each associated with the first task. Also, the respective time lengths of the period T41 of the partial data 151, the period T51 of the partial data 161, and the period T61 of the partial data 171 are all equal to the standard amount of time required to have the first task done. That is to say, the time lag between the start time t51 of the operation data set 150 and the division point t52, the time lag between the start time t61 of the operation data set 160 and the division point t62, and the time lag between the start time t71 of the operation data set 170 and the division point 172 are each equal to the standard amount of time required to have the first task done.

Likewise, the partial data 152, 162, and 172 are each associated with the second task. Also, the respective time lengths of the period T42 of the partial data 152, the period T52 of the partial data 162, and the period T62 of the partial data 172 are all equal to the standard amount of time required to have the second task done. That is to say, the time lag between the division point t52 and division point t53, the time lag between the division point t62 and division point t63, and the time lag between the division point t72 and division point t73 are each equal to the standard amount of time required to have the second process step done.

Likewise, the partial data 153, 163, and 173 are each associated with the third task. Also, the respective time lengths of the period T43 of the partial data 153, the period T53 of the partial data 163, and the period T63 of the partial data 173 are all equal to the standard amount of time required to have the third task done. That is to say, the time lag between the division point t53 and division point t54, the time lag between the division point t63 and division point t64, and the time lag between the division point t73 and division point t74 are each equal to the standard amount of time required to have the third task done.

Likewise, the partial data 154, 164, and 174 are each associated with the fourth task. Also, the respective time lengths of the period T44 of the partial data 154, the period T54 of the partial data 164, and the period T64 of the partial data 174 are all equal to the standard amount of time required to have the fourth task done. That is to say, the time lag between the division point t54 and the end time t55 of the operation data set 150, the time lag between the division point t64 and the end time t65 of the operation data set 160, and the time lag between the division point t74 and the end time t75 of the operation data set 170 are each equal to the standard amount of time required to have the fourth task done.

Furthermore, after the estimator 43 has estimated the division points, the partial data divider 41 according to the second embodiment changes the time length of the operation data set back into the original time length before the adjustment. In addition, the partial data divider 41 corrects the timing set by the estimator 43 to maintain the same ratio of the time lengths of the partial data. For example, if the operation data set 140 has a time length of 120 seconds and if the operating time of one cycle of routine operations as defined by the operation instructions is 100 seconds, then the estimator 43 estimates points in time, which are respectively 40 and 70 seconds later than the start time, to be the division points. In this case, the partial data divider 41 corrects the division points that have been estimated by the estimator 43 into points in time, which are respectively 48 and 84 seconds later than the start time. Furthermore, the partial data divider 41 divides the operation data set 140, of which the time length is 120 seconds, into three partial data at the division points that are respectively 48 and 84 seconds later than the start time.

In the operations management system 1 according to the second embodiment, the partial data divider 41 makes the time length of the operation data set equal to the standard amount of time as defined by the operation instructions and divides the operation data set into partial data according to the standard amount of time required to have the task done as defined by the operation instructions. This makes it easier to estimate the division points in a situation where the worker's operating rate varies from one cycle of the routine operations to another.

Variation

A partial data divider 41 according to a variation performs the partial data division processing differently in the following respects from the counterpart of the second embodiment.

Specifically, the partial data divider 41 according to this variation performs the processing of adjusting the time length of an operation data set before dividing the operation data set into partial data and then divides the operation data set into partial data in accordance with the operation instructions. In this case, the partial data divider 41 adjusts the time length of the operation data set to make the time length of the operation data set equal to a predetermined time length. In this case, the predetermined time length does not have to be the same as the operating time of one cycle of routine operations as defined by the operation instructions but may also be an arbitrary time length. The partial data divider 41 sets one or more division points with respect to the operation data set, of which the time length has been adjusted. The partial data divider 41 sets one or more division points to make the ratio of the respective time lengths of a plurality of partial data, which are divided from a single operation data set, equal to the ratio of the respective standard amounts of time required to have the respective tasks done as defined by the operation instructions.

Alternatively, the partial data divider 41 may perform interpolation processing on an operation data set to make the number of data samples included in the operation data set equal to a predetermined number before the operation data set is divided. For example, after the interpolation has been performed, the number of data samples of the operation data set may be equalized with the number of samples of another operation data set 150, for which the degree of similarity is to be calculated. Alternatively, the partial data divider 41 may make interpolation on an operation data set, for which the degree of similarity calculator 42 calculates the degree of similarity to the divided partial data. For example, the partial data divider 41 may determine that both the operation data set, for which the division points need to be set, and the operation data set to be used by the degree of similarity calculator 42 to calculate the degree of similarity have the same number of samples to be taken when the standard amount of time required as defined by the operation instructions is sampled at a predetermined sampling frequency. More specifically, the partial data divider 41 performs interpolation processing on the operation data sets 120 and 130 to generate an interpolated operation data set 150 and an interpolated operation data set 160. The partial data divider 41 divides the interpolated operation data set 150 into plurality of partial data 151-154 and divides the interpolated operation data set 160 into plurality of partial data 161-164 in accordance with the ratio of the respective standard amounts of time required to have the respective tasks done as defined by the operation instructions. The estimator 43 estimates the division points for the partial data 161-164 based on the degree of similarity to the partial data 151-154 of the interpolated operation data set 150.

Optionally, the partial data divider 41 may perform the processing of interpolating and smoothing the operation data set 130 when generating the interpolated operation data set 160. According to exemplary smoothing processing, the value of the interpolated operation data set may be determined by calculating a moving average based on respective values of samples that respectively precede and follow each sample obtained by the interpolation processing. However, this smoothing processing is only an example and should not be construed as limiting. Rather, any other type of smoothing processing may also be performed as long as the effect of noise may be reduced. For example, a method of determining the value using a Kalman filter may also be adopted.

The operations management system 1 according to this variation enables obtaining an interpolated operation data set 160 that always has the same number of samples without being affected by a dispersion in the amount of time required from one operation data set to another. This makes it easier to determine the degree of similarity between a plurality of operation data sets, thus reducing the computational complexity to estimate division points for the operation data set 130 based on the degree of similarity.

Other Variations of Embodiments (1) In the exemplary embodiments and their variations described above, the operations management system 1 acquires a moving picture by shooting a worker who is performing the routine operations repeatedly. However, the processing of detecting a time series variation in respective locations of points set on the worker's body based on the moving picture shooting the worker does not have to be performed by the operations management system 1. Alternatively, the operations management system 1 may acquire, from another system, either continuous operation data representing a time series variation in the locations of points set on the body of the worker who is performing the routine operations repeatedly or an operation data set representing a time series variation in the locations of points set on the worker's body for one cycle of the routine operations.

(2) In the exemplary embodiments and their variations described above, the operation data generator 20 of the operations management system 1 divides the continuous operation data into operation data sets based on the operation log of a conveyor. However, information indicating the start or end time of one cycle of the routine operations does not have to be the operation log of the conveyor. For example, if a switch that the worker uses to notify the operations management system 1 of the end of operations for one cycle is provided in the workstation, then the operation data generator 20 may divide the continuous operation data into the operation data sets based on the input log of the switch. Alternatively, on detecting an operation indicating the beginning or end of one cycle of the routine operations, the moving picture processor 10 may output information indicating the start or end time of one cycle of the routine operations and the operation data generator 20 may divide the continuous operation data into the operation data sets in accordance with the information provided by the moving picture processor 10. Such an operation indicating the beginning of one cycle of the routine operations may be, for example, the operation of the worker who removes the work target from the conveyor and puts the work target on a work bench.

(3) In the exemplary embodiments and their variations described above, the continuous operation data and the operation data sets each include coordinates, which provide location information about a point on a time-by-time basis, as a piece of information representing a time series variation in respective locations of points set on the worker's body. However, the information representing a time series variation in respective locations of points set on the worker's body does not have to be the location information provided about a point on a time-by-time basis. Alternatively, the information representing a time series variation in respective locations of points set on the worker's body may also be velocity information provided about a point on a time-by-time basis. This allows, even if the location of the worker's body with respect to an image capturing means for capturing an image of the worker is changing, the operations management system 1 to accurately estimate the division points for the operation data sets and evaluate the partial data based on the movement of the points on the worker's body. That is to say, this reduces, even if the workstation where the worker's is operating has shifted or the image capturing means for capturing an image of the worker has moved, the chances of causing a decline in the accuracy of estimating the division points for the operation data sets or evaluating the partial data. Still alternatively, the information indicating a time series variation in respective locations of points set on the worker's body may also be acceleration information provided about a point on a time-by-time basis. This further reduces the effect of some change that depends on either the worker or the worker's operating cycle (such as the workstation where the worker's is operating or the build of the worker) on the operation data sets.

(4) In the exemplary embodiments and their variations described above, the degree of operation data set similarity of the operation data set 120 is supposed to be the sum of the degree of operation data set similarity of the operation data set 130 and the degree of operation data set similarity of the operation data set 140. Alternatively, the degree of operation data set similarity of the operation data set 120 may also be the same as the degree of operation data set similarity of the operation data set 130.

(5) In the exemplary embodiments and their variations, in the continuous operation data and operation data sets, the information representing the location of a point set on the worker's body is coordinates in a frame of a moving picture. However, the information representing the location of a point set on the worker's body does not have to be coordinates in a frame of a moving picture. Alternatively, the information representing the location of a point set on the worker's body may also be a relative location by reference to the location of the point on the worker as detected by skeleton detection. Such a location of a point on the worker used as a reference location may be set on, for example, the worker's neck. This reduces the chances of causing a decline in the accuracy of estimation of the division points for the operation data sets and the accuracy of evaluation of the partial data due to a shift of the workstation where the worker is working.

Note that the locations of respective points set on the worker's body do not have to be detected by the skeleton detection but may also be detected based on the locations of the markers that the worker wears.

Recapitulation

An operations management system (1) according to a first aspect includes a storage device (30), a first divider (41), a degree of similarity calculator (42), and an estimator (43). The storage device (30) stores multiple operation data sets (120, 130). The multiple operation data sets (120, 130) are information representing, with respect to operations to be repeated a number of times, respectively, a time series variation in location of at least one point set on a body of a person who is performing the operations on a repeat unit basis. The first divider (41) divides each of the multiple operation data sets (120, 130) into a predetermined number of partial data (121-124, 131-134). The multiple operation data sets (120, 130) include a first operation data set (130) and a second operation data set (120). The first operation data set (130) is divided into a plurality of first partial data (131-134), each of which is the partial data. The second operation data set (120) is divided into a plurality of second partial data (121-124), each of which is the partial data. The degree of similarity calculator (42) calculates a degree of similarity between each of the plurality of first partial data (131-134) and second partial data (121-124) corresponding to the first partial data (131-134) and belonging to the plurality of second partial data (121-124). The degree of similarity calculator (42) also calculates a degree of first operation data set similarity (130) by adding together the respective degrees of similarity that have been calculated with respect to all of the plurality of first partial data (131-134). The estimator (43) estimates one or more division points where the first operation data set (130) is divided to maximize the degree of first operation data set similarity.

The operations management system (1) according to this aspect may accurately extract, based on the degree of similarity between the operation data sets (120, 130) corresponding to respective operations to be repeated a number of times, partial data (121-124, 131-134) corresponding to multiple tasks of the operations in the repeat unit of the operations. This enables obtaining, even if there is no reference data to be compared with the operation data sets (120, 130), partial data (121-124, 131-134) corresponding to multiple tasks of the operations and determining whether each of the multiple tasks of the operations is being performed appropriately.

In an operations management system (1) according to a second aspect, which may be implemented in conjunction with the first aspect, each of the multiple operation data sets (120, 130) is information representing, on a repeat unit basis, time series variations in respective locations of multiple points set on the body of the person who is performing the operations.

In the operations management system (1) according to this aspect, each of the operation data sets (120, 130) includes information representing time series variations in respective locations of multiple points set on the body of the person who is performing the operations This allows the operations management system (1) to highly accurately estimate, based on at least one of the multiple points set on the body of the worker, division points where the first operation data set (130) is divided into the plurality of first partial data (131-134).

In an operations management system (1) according to a third aspect, which may be implemented in conjunction with the second aspect, the degree of similarity calculator (42) calculates, with respect to each of the multiple points set on the body of the person who is performing the operations, a degree of partial data similarity as a degree of similarity between each of the plurality of first partial data (131-134) and second partial data (121-124) corresponding to the first partial data (131-134) and belonging to the plurality of second partial data (121-124). The degree of similarity calculator (42) also calculates the degree of first operation data set similarity by adding together the respective degrees of partial data similarity that have been calculated with respect to all of the plurality of first partial data (131-134) and with respect to all of the multiple points.

In the operations management system (1) according to this aspect, the degree of first operation data set similarity calculated by the degree of similarity calculator (42) increases with respect to any pair of the multiple points set on the body of the worker if the time series variations in their locations are similar. This allows, even if a significantly moving part of the worker's body changes from one task to another, the operations management system (1) to highly accurately estimate the division points where the first operation data set (130) is divided into a plurality of first partial data (131-134).

In an operations management system (1) according to a fourth aspect, which may be implemented in conjunction with any one of the first to third aspects, the first divider (41) makes a ratio of respective time lengths of the plurality of first partial data (131-134) equal to a ratio of respective amounts of time required to have multiple tasks done as defined by operation instructions. The estimator (43) estimates the division points based on a correlation between respective start times of the plurality of first partial data (131-134) and the degree of first operation data set similarity.

The operations management system (1) according to this aspect divides the first operation data set (130) into a plurality of partial data (131-134) in accordance with the operation instructions and estimates, based on the degree of similarity, the division points of the first operation data set (130). There is no significant difference between the points where the first operation data set (130) is divided by the first divider (41) into the plurality of first partial data (131-134) and the division points estimated by the estimator (43). This allows the operations management system (1) to estimate, the points as the division points in accordance with the operation instructions and reduce the computational complexity to estimate the division points.

In an operations management system (1) according to a fifth aspect, which may be implemented in conjunction with any one of the first to third aspects, the first divider (41) performs interpolation processing on at least one of the first operation data set (130) or the second operation data set (120) to make a time length of the first operation data set (130; 160) stored after the interpolation processing as long as a time length of the second operation data set (120; 150) stored after the interpolation processing. The first divider (41) also divides the first operation data set (130; 160) into the plurality of first partial data (131-134; 161-164) based on the respective amounts of time required to have the multiple tasks done as defined by the operation instructions. The estimator (43) estimates the division points based on a correlation between respective start times of the plurality of first partial data (131-134; 161-164) and the degree of first operation data set similarity.

The operations management system (1) according to this aspect may always obtain interpolated operation data (160) having the same number of samples without being affected by a dispersion in the amount of time required for each operation data set. This makes it easier to determine the degree of similarity between multiple operation data sets, thus reducing the computational complexity to estimate the division points of the operation data (130) based on the degree of similarity.

An operations management system (1) according to a sixth aspect, which may be implemented in conjunction with any one of the first to fifth aspects, further includes a continuous operation data acquirer (21) and a second divider (22). The continuous operation data acquirer (21) acquires continuous operation data (110). The continuous operation data (110) is the information representing, with respect to the operations to be repeated the number of times, the time series variation in the location of the at least one point set on the body of the person who is performing the operations The second divider (22) generates a plurality of the operation data sets (120, 130) by dividing the continuous operation data (110) on the repeat unit basis.

The operations management system (1) according to this aspect may make operations management by acquiring the continuous operation data (110) instead of the operation data (120, 130), thus simplifying the preparation procedure required for the operations management.

An operations management system (1) according to a seventh aspect, which may be implemented in conjunction with any one of the first to sixth aspects, further includes an evaluator (50). The evaluator (50) evaluates, based on the plurality of first partial data (131-134) with respect to the one or more division points estimated by the estimator (43), the operations performed by the person and corresponding to the first operation data set (130).

The operations management system (1) according to this aspect may determine, based on the plurality of first partial data (131-134) extracted highly accurately from the first operation data set (130), whether each of the multiple tasks included in the operations corresponding to the first operation data set (130) is being performed appropriately.

In an operations management system (1) according to an eighth aspect, which may be implemented in conjunction with the seventh aspect, the evaluator (50) presents, according to evaluation of the operations corresponding to the first operation data set (130), information about the operations performed by the person and corresponding to the first operation data set (130).

The operations management system (1) according to this aspect may provide, based on the evaluation made by the evaluator (50) on the operations corresponding to the first operation data set (130), the worker with information indicating whether the operations corresponding to the first operation data set (130) is being performed appropriately. This enables presenting, for example, the reason why the operations being performed by the worker would be inappropriate, or the operations would not be being performed as per the operation instructions, or the worker's skills would be insufficient or the operations would be too difficult for the worker to handle, with respect to each of the multiple tasks included in the operations corresponding to the first operation data set (130).

In an operations management system (1) according to a ninth aspect, which may be implemented in conjunction with any one of the first to eighth aspects, each of the multiple operation data sets (120, 130) is information indicating, on a time-by-time basis, the location of the at least one point set on the body of the person who is performing the operations.

The operations management system (1) according to this aspect may make operations management by a simple method that uses operation data sets (120, 130) created by applying location detection technique to the person's body.

In an operations management system (1) according to a tenth aspect, which may be implemented in conjunction with any one of the first to eighth aspects, each of the multiple operation data sets (120, 130) is information representing, on a time-by-time basis, a moving velocity of the at least one point set on the body of the person who is performing the operations.

The operations management system (1) according to this aspect improves the accuracy of the operations management by removing, from the operation data sets (120, 130), factors depending on either the worker or the operating cycle such as the workstation where the worker is working and the build of the worker.

In an operations management system (1) according to an eleventh aspect, which may be implemented in conjunction with any one of the first to eighth aspects, each of the multiple operation data sets (120, 130) is information representing, on a time-by-time basis, acceleration of the at least one point set on the body of the person who is performing the operations.

The operations management system (1) according to this aspect improves the accuracy of the operations management by removing, from the operation data sets (120, 130), factors depending on either the worker or the operating cycle such as the workstation where the worker is working and the build of the worker.

An operations management method according to a twelfth aspect includes a storing step, a dividing step, a degree of similarity calculating step, and an estimating step. The storing step includes storing multiple operation data sets (120, 130). The multiple operation data sets (120, 130) are information representing, with respect to operations to be repeated a number of times, respectively, a time series variation in location of at least one point set on a body of a person who is performing the operations on a repeat unit basis. The dividing step includes dividing each of the multiple operation data sets (120, 130) into a predetermined number of partial data (121-124, 131-134). The multiple operation data sets (120, 130) include a first operation data set (130) and a second operation data set (120). The first operation data set (130) is divided, by performing the dividing step, into a plurality of first partial data (131-134). The second operation data set (120) is divided, by performing the dividing step, into a plurality of second partial data (121-124). The degree of similarity calculating step includes calculating a degree of similarity between each of the plurality of first partial data (131-134) and second partial data (121-124) corresponding to the first partial data (131-134) and belonging to the plurality of second partial data (121-124). The degree of similarity calculating step further includes calculating a degree of first operation data set similarity by adding together the respective degrees of similarity that have been calculated with respect to all of the plurality of first partial data (131-134). The estimating step includes estimating one or more division points where the first operation data set (130) is divided to maximize the degree of first operation data set similarity.

The operations management method according to this aspect enables accurately extracting, based on the degree of similarity between the operation data sets (120, 130) corresponding to respective operations to be repeated a number of times, partial data (121-124, 131-134) corresponding to multiple tasks in the repeat unit of the operations. This enables obtaining, even if there is no reference data to be compared with the operation data sets (120, 130), partial data (121-124, 131-134) corresponding to multiple tasks of the operations and determining whether each of the multiple tasks of the operations is being performed appropriately.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An operations management system comprising:
a moving picture acquirer that acquires moving picture data of a person who is repeatedly performing operations;
a storage device configured to store multiple operation data sets as information representing, with respect to the operations to be repeated a number of times, respectively, a time series variation in location of at least one point set on a body of the person who is performing the operations on a repeat unit basis, the multiple operation data sets being extracted from the moving picture data;
a first divider configured to divide each of the multiple operation data sets into a predetermined number of partial data;
a degree of similarity calculator; and
an estimator,
the multiple operation data sets including a first operation data set and a second operation data set,
the first operation data set being divided into a plurality of first partial data, each of the plurality of first partial data being from among the predetermined number of partial data,
the second operation data set being divided into a plurality of second partial data, each of the plurality of second partial data being from among the predetermined number of partial data,
the degree of similarity calculator being configured to:
calculate a degree of similarity between each of the plurality of first partial data and second partial data corresponding to the first partial data and belonging to the plurality of second partial data; and
calculate a degree of first operation data set similarity by adding together the respective degrees of similarity that have been calculated with respect to all of the plurality of first partial data,
the first divider is configured to make a ratio of respective time lengths of the plurality of first partial data equal to a ratio of respective amounts of time required to have multiple tasks done as defined by operation instructions, and
the estimator being configured to estimate, by Bayesian optimization using respective start times of the plurality of first partial data and the degree of first operation data set similarity, one or more division points where the first operation data set is divided to maximize the degree of first operation data set similarity.

2. The operations management system of claim 1, wherein each of the multiple operation data sets is information representing, on a repeat unit basis, time series variations in respective locations of multiple points set on the body of the person who is performing the operations.

3. The operations management system of claim 2, wherein the degree of similarity calculator is configured to:
calculate, with respect to each of the multiple points set on the body of the person who is performing the operations, a degree of partial data similarity as a degree of similarity between each of the plurality of first partial data and second partial data corresponding to the first partial data and belonging to the plurality of second partial data; and
calculate the degree of first operation data set similarity by adding together the respective degrees of partial data similarity that have been calculated with respect to all of the plurality of first partial data and with respect to all of the multiple points.

4. The operations management system of claim 1, wherein the first divider is configured to:
perform interpolation processing on at least one of the first operation data set or the second operation data set to make a time length of the first operation data set stored after the interpolation processing as long as a time length of the second operation data set stored after the interpolation processing; and
divide the first operation data set into the plurality of first partial data based on the respective amounts of time required to have the multiple tasks done as defined by the operation instructions, and
the estimator is configured to estimate the division points based on a correlation between respective start times of the plurality of first partial data and the degree of first operation data set similarity.

5. The operations management system of claim 1, further comprising:
a continuous operation data acquirer configured to extract, from the moving picture data, continuous operation data as the information representing, with respect to the operations to be repeated the number of times, the time series variation in the location of the at least one point set on the body of the person who is performing the operations, and
a second divider configured to generate a plurality of the operation data sets by dividing the continuous operation data on the repeat unit basis.

6. The operations management system of claim 1, further comprising an evaluator configured to evaluate, based on the plurality of first partial data with respect to the one or more division points estimated by the estimator, the operations performed by the person and corresponding to the first operation data set.

7. The operations management system of claim 6, wherein the evaluator is configured to present, according to evaluation of the operations corresponding to the first operation data set, information about the operations performed by the person and corresponding to the first operation data set.

8. The operations management system of claim 1, wherein each of the multiple operation data sets is information indicating, on a time-by-time basis, the location of the at least one point set on the body of the person who is performing the operations.

9. The operations management system of claim 1, wherein each of the multiple operation data sets is information representing, on a time-by-time basis, a moving velocity of the at least one point set on the body of the person who is performing the operations.

10. The operations management system of claim 1, wherein
each of the multiple operation data sets is information representing, on a time-by-time basis, acceleration of the at least one point set on the body of the person who is performing the operations.

11. An operations management method performed by an operations management system including a processor and a non-transitory memory, the operations management method comprising:

an acquiring step performed by the processor, the acquiring step including acquiring moving picture data of a person who is repeatedly performing operations;

a storing step performed by the processor using the non-transitory memory, the storing step including storing multiple operation data sets as information representing, with respect to the operations to be repeated a number of times, respectively, a time series variation in location of at least one point set on a body of the person who is performing the operations on a repeat unit basis, the multiple operation data sets being extracted from the moving picture data;

a dividing step performed by the processor, the dividing step including dividing each of the multiple operation data sets into a predetermined number of partial data;

a degree of similarity calculating step performed by the processor; and an estimating step performed by the processor, the multiple operation data sets including a first operation data set and a second operation data set, the first operation data set being divided, by performing the dividing step, into a plurality of first partial data, each of the plurality of first partial data being from among the predetermined number of partial data, the second operation data set being divided, by performing the dividing step, into a plurality of second partial data, each of the plurality of second partial data being from among the predetermined number of partial data, the degree of similarity calculating step including:

calculating a degree of similarity between each of the plurality of first partial data and second partial data corresponding to the first partial data and belonging to the plurality of second partial data; and calculating a degree of first operation data set similarity by adding together the respective degrees of similarity that have been calculated with respect to all of the plurality of first partial data, the dividing step including making a ratio of respective time lengths of the plurality of first partial data equal to a ratio of respective amounts of time required to have multiple tasks done as defined by operation instructions, and the estimating step including estimating, by Bayesian optimization using respective start times of the plurality of first partial data and the degree of first operation data similarity, one or more division points where the first operation data set is divided to maximize the degree of first operation data set similarity.

* * * * *